L. I. ZIEGLER.
ELECTRIC SHAFT MOUNTING.
APPLICATION FILED JUNE 21, 1920.

1,373,930.

Patented Apr. 5, 1921.

Witness
Frank A. Fable

Inventor
Leslie I. Ziegler
By Hood Schley
Attorneys

UNITED STATES PATENT OFFICE.

LESLIE I. ZIEGLER, OF INDIANAPOLIS, INDIANA, ASSIGNOR TO NORDYKE & MARMON COMPANY, OF INDIANAPOLIS, INDIANA, A CORPORATION OF INDIANA.

ECCENTRIC-SHAFT MOUNTING.

1,373,930.    Specification of Letters Patent.    Patented Apr. 5, 1921.

Application filed June 21, 1920. Serial No. 390,367.

*To all whom it may concern:*

Be it known that I, LESLIE I. ZIEGLER, a citizen of the United States, residing at Indianapolis, in the county of Marion and State of Indiana, have invented a new and useful Eccentric-Shaft Mounting, of which the following is a specification.

The object of my invention is to produce a compact structure especially designed for use in connection with vibratory sifters, but not necessarily limited to such use, for supporting and oiling the eccentric shaft and eccentric strap.

Figure 1:
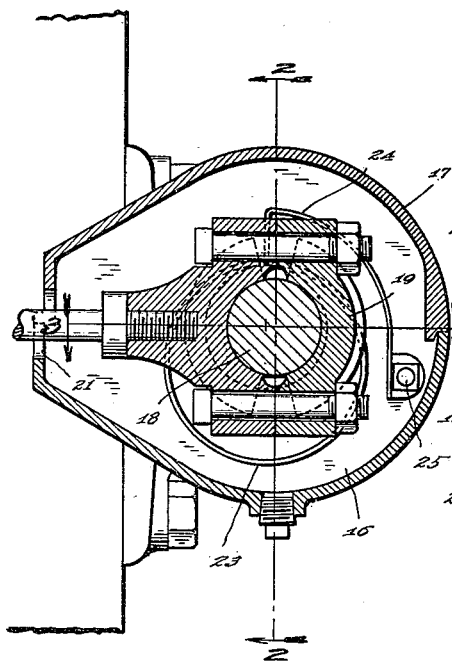
Figure 2:
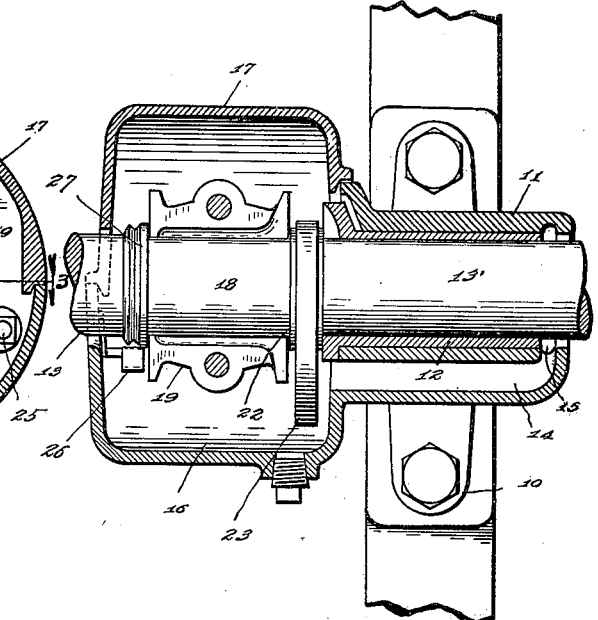
Figure 3:
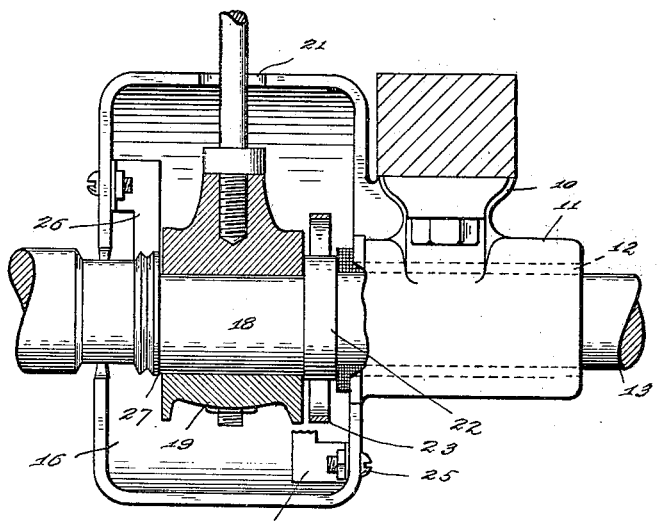

The accompanying drawings illustrate my invention. Figure 1 is a vertical section through the eccentric strap; Fig. 2 a vertical section on line 2—2 of Fig. 1; Fig. 3 a horizontal section on line 3—3 of Fig. 1.

In the drawings, 10 indicates a bracket casting having a tubular portion 11 adapted to receive a bearing bushing 12 for the reception and support of the journal portion 13′ of shaft 13. Within the tubular portion 11, at its under side, is formed an oil drainage passage 14 which communicates with a space 15 formed within the tubular portion 11 at the outer end of the bushing 12. The drainage passage 14 leads into an oil reservoir 16, which is integral with portion 11, and at one end thereof. The oil reservoir 16 is open at its top, approximately on the axle line of shaft 13, and is covered by a removable cover 17, the oil reservoir 16 and cover 17, thus forming a chamber around the eccentric 18 of shaft 13 and the eccentric strap 19 which is mounted on the eccentric 18, the shank of said strap 19 projecting through an opening 21 formed by notches in the adjacent edges of reservoir 16 and cover 17.

Between journal 13′ and the eccentric 18, I form a ring support or collar 22, which is concentric with the shaft 13 and upon which is mounted a ring oiler 23 of ordinary form, said ring 23 being of sufficient diameter to extend well down into reservoir 16. Contacting with the outer periphery of ring 23 is a light spring scraper 24 secured at 25 within reservoir 16. There is a similar scraper 26 mounted within the reservoir and contacting with a collar 27 formed on shaft 13 at one end of eccentric 18.

By the above-described compact structure, I find it possible to thoroughly lubricate both the journal 13′ and eccentric 18 by means of the single oiling ring 23.

I claim as my invention:

1. The combination with a journal bearing and oil reservoir arranged at one end thereof, of an eccentric shaft journaled in said bearing and carrying an eccentric closely adjacent the bearing, an eccentric strap mounted on the eccentric, and an oiling ring mounted on the shaft between the bearing and eccentric so as to deliver oil to both journal and eccentric, said oiling ring depending into the oil reservoir.

2. The combination with a journal bearing of an open-top oil reservoir formed integral therewith at one end thereof and having a drainage passage communicating therewith and leading from the far end of the bearing, a removable cover for said reservoir, an eccentric strap journaled in the bearing and having an eccentric within the reservoir, and an oil ring mounted upon the shaft between the journal bearing and eccentric and depending into the reservoir.

3. The combination with a journal bearing of an open-top oil reservoir formed integral therewith at one end thereof, a removable cover for said reservoir, an eccentric strap journaled in the bearing and having an eccentric within the reservoir, and an oil ring mounted upon the shaft between the journal bearing and eccentric and depending into the reservoir.

In witness whereof, I have hereunto set my hand at Indianapolis, Indiana, this 7th day of June, A. D. one thousand nine hundred and twenty.

LESLIE I. ZIEGLER.